United States Patent [19]

McLaughlin

[11] 4,282,124

[45] Aug. 4, 1981

[54] DIETHYL FUMARATE REACTIVE DILUENT FOR AIR DRY COATINGS

[75] Inventor: Joseph E. McLaughlin, Philadelphia, Pa.

[73] Assignee: E. I. Du Pont de Nemours and Company, Wilmington, Del.

[21] Appl. No.: 94,284

[22] Filed: Nov. 14, 1979

[51] Int. Cl.$^3$ ............... B32B 15/08; B32B 27/40; C09D 3/64; C09D 3/80
[52] U.S. Cl. ............... 260/22 A; 260/22 CB; 260/31.8 R; 260/31.8 XA; 427/407.1; 427/409; 428/423.1; 428/423.7; 428/424.4; 428/458; 428/463
[58] Field of Search ........... 260/22 CB, 22 A, 31.8 R, 260/31.8 XA; 427/407.1, 409; 428/423.1, 423.7, 424.4, 458, 463

[56] References Cited

U.S. PATENT DOCUMENTS

| | | | |
|---|---|---|---|
| 3,594,439 | 7/1971 | Baker | 260/22 A |
| 4,066,586 | 1/1978 | Tanuma et al. | 260/22 CB |
| 4,100,133 | 7/1978 | Emmons et al. | 260/45.9 L |
| 4,102,837 | 7/1978 | Thomas | 260/22 CB |
| 4,116,903 | 9/1978 | Lietz et al. | 260/22 CB |
| 4,138,390 | 2/1979 | Emmons et al. | 260/45.9 L |
| 4,209,438 | 6/1980 | Okada et al. | 260/31.8 XA |

OTHER PUBLICATIONS

Chemical Abstracts, vol. 76, No. 22, May 29, 1972, p. 127893t.

Primary Examiner—Ronald W. Griffin
Attorney, Agent, or Firm—James H. Ryan

[57] ABSTRACT

Diethyl fumarate can be used in proportions of up to 50% by weight to dilute oxidative-cure coating systems, e.g., alkyds, to permit higher solids, i.e., lower volatile solvents, content and to enhance through-cure of thick films without wrinkling.

16 Claims, No Drawings

DIETHYL FUMARATE REACTIVE DILUENT FOR AIR DRY COATINGS

BACKGROUND OF THE INVENTION

1. Field of the Invention

This invention provides oxidative-drying coating compositions, e.g., alkyds, of high solids content made possible by blending the oxidative-drying material with diethyl fumarate.

WARNING: Diethyl fumarate may cause a skin rash unless it is handled carefully.

2. Prior Art

Di($C_4$–$C_{10}$)alkyl fumarates, etc., are used in various coating compositions, e.g., in Emmons et al. U.S. Pat. Nos. 4,100,133 and 4,138,390.

Alkyds are well known. See, for example, Solomon, *The Chemistry of Organic Film Formers*, pp. 75–131, Krieger Publishing Co. (Second Edition; 1977).

DESCRIPTION OF THE INVENTION

In accordance with the present invention, it has been found that blending oxidative-drying coating materials such as conventional alkyds with 1–50% by weight of diethyl fumarate yields improvements. Even in the lower range of the addition, e.g., 1–20% by weight of diethyl fumarate diluent, through cure of thick films is enhanced without wrinkling. In the upper range, particularly, e.g., 20–50% by weight, higher solids content and lower viscosity are obtained. Concomitant with the higher solids content, of course, is a reduced volume of volatile organic solvents and reduced pollution.

It is not entirely certain how the diethyl fumarate functions, and the applicant does not propose to be bound by any particular theory. Possibly, however, the drying oil portion of the alkyd resin forms a hydroperoxide which is decomposed by the cobalt ion to form a free radical. The free radical then initiates a free-radical polymerization of the diethyl fumarate. Reaction is evident from the fact that the alkyd-fumarate mixture solidifies, diethyl fumarate itself being a liquid.

The use of the diethyl fumarate is very simple. It is merely mixed with the alkyd, or other oxidative-drying material, at the time of application, and this mixture applied as an alkyd in normal fashion. Thus, an alkyd mixed with up to an equal weight of diethyl fumarate (50:50 mixture) can be applied externally to a metal base, e.g., an oil tank, in a thick layer. Drying in the air is usually complete in 72 hours. Drying occurs readily over a wide temperature range from about 35° F. to about 140° F.

Alkyds are not the only materials that can be diluted or blended with diethyl fumarate. Other oxidative-drying systems can be so treated, as, for example, acrylates containing drying-oil side chains.

It will be appreciated that the normal additives for paints or enamels can be included along with the alkyd or other oxidative-curable film-former and diethylfumarate in this invention. In particular, pigments can be included. Thus, a 50:50 blend of alkyd: diethyl fumarate can contain up to 75% by weight of pigment. Anti-skinning agents, dispersants, flow control agents, etc., can also be present.

The diethyl fumarate:alkyd mixtures of this invention retain the utilities of the alkyds (or other oxidative-curing material) upon which they are based. Thus, they can be used as coatings or paints as they would be without the diethyl fumarate diluent (cf. Example 4 below). The mixtures do have the advantage, however, that, in general, they release less volatile solvent into the air than do the same oxidative-curing material without the diluent.

Higher alkyl esters of fumaric acid dry more slowly than the diethyl derivatives. Hence, the latter is preferred.

There follow some examples showing conventional alkyds blended with diethyl fumarate. In these examples, proportions, parts and percentages are by weight and mixing and drying temperatures are ambient, e.g., a room temperature of about 65°–70° F.

EXAMPLE 1

Short-Oil Alkyd

An alkyd was selected made up from tall oil fatty acid (34%), pentaerithrytol phthalate (54.5%) and pentaerythritol (11.2%). The solid alkyd was dissolved to make a 50:50 mixture (50% solids) in a conventional aromatic solvent, xylene (42%), toluene (42%), and Solvesso ® 100 (aromatics; 86%).

Tests were made by placing the test material in a tare dish with a conventional 0.05% cobalt and 0.2% lead on polymer solids drier and weighing the glass at the end of a predetermined interval.

Blends of this invention were made up with the alkyd solution and diethyl fumarate in the proportions (2) 75:25 and (3) 50:50. A control (1) contained no diethyl fumarate. When the drier was added, the control (1) dried immediately. At the end of two hours, (2) was tack free but (3) was still tacky. At the end of 3½ hours, (2) and (3) were both tack free. Some reaction must have taken place since otherwise there would have been wetting.

The results of tests for percentage solids made after the tare dishes stood at ambient temperature for the indicated time were as follows:

|  | 1 | 2 | 3 |
|---|---|---|---|
| 0 (theoretical solids) | 50.07% | 57.2% | 66.5% |
| 7 hours | 53.8 | 61.2 (tacky) | 69.2 (wet) |
| 72 hours | 51.2 | 57.0 (dry) | 58.0 (slighty tacky) |

Volatile content is obviously lower in the compositions of this invention.

EXAMPLE 2

A soft, drying-oil alkyd was selected consisting of linseed oil (55%), glycerol phthalate (40.7%) and glycerine (4.3%). The alkyd was dissolved to 72% solids in aliphatic hydrocarbons containing 14% isopropanol and 14% toluene. As in Example 1, mixtures were made up with alkyd solution/diethyl fumarate ratios of 75:25 (2) and (3) 50:50.

Samples of the alkyd solution as a control (1) and (2) and (3), all containing 0.05% cobalt drier, were spread as film 2–3 mils thick on separate steel panels and allowed to dry under ambient conditions. Coating (1) was slightly tacky at the end of 1 hour and still soft, without through-dry, at the end of 7 hours. Coating (2) was still wet at the end of 1 hour but tack free at the end of 5 hours and exhibited a tack free hard through-dry at the end of 7 hours. Coating (3) remained wet after 1½ hours but was tack free in 6 and dried through in 7.

A commercial blue polyurethane enamel (Ice Blue Imron ®; Imron ® is a registered trademark of E. I. du Pont de Nemours and Company) was applied to each of the coated panels at the end of a 24-hours' dry and itself allowed to dry. The control (1) immediately showed very severe wrinkling and lifting. The films containing diethyl fumarate were wrinkle free, and there was no lifting.

This example shows that the alkyd:diethyl fumarate blends of the invention can be used as primers giving undercoatings with improved wrinkling and cure properties.

EXAMPLE 3

Another alkyd, consisting of linseed oil (64%), glycerol phthalate (33.8%) and glycerine (2.2%) was dissolved to produce 82% solids in a mixture of aliphatics (82%), toluene (12%) and butyl Cellosolve ®. Mixtures of alkyd:diethyl fumarate of 75:25 (2) and 50:50 (3) ratios were again made, the original alkyd solution serving as control (1).

Drying tests were run as in Example 1 under various conditions, cobalt naphthenate (0.05%) being added in each case. Results from tare dishes were as follows:

|  | 1 | 2 | 3 |
|---|---|---|---|
| Initial theoretical solids (including diethyl fumarate) | 83% | 87% | 90.7% |
| Solids if all solvent, including diethyl fumarate, were volatilized | 83% | 64.8% | 45.1% |
| Vacuum at 45° C. for 20 hrs. (stringent conditions) | 85% | 67% | 47% |
| Dry at room temperature for 24 hours | 94.1% | 83% | 71% |

Films were also formed on panels by draw-down with a 10-mil clearance doctor blade. Film from (1) wrinkled badly with no through dry after 24 hours. Films (2) and (3) showed good through dry with no wrinkling.

This example shows that wrinkle free films 8–10 mils thick of good quality can be obtained by the products of this invention.

EXAMPLE 4

Pigmented Film

Tests were run on control and experimental films containing pigment. A green commercial paint based on an alkyd of the same composition as that in Example 1 in mineral spirits with about 20% by volume pigments was the control. The experimental paint of the invention was the same paint mixed with diethyl fumarate to give a 50:50 alkyd:fumarate ratio. Both paints were spread on steel panels in a film about 2 mils thick and tested with results as follows ( data are in weight percent of solids):

|  | Control | | Experimental | |
|---|---|---|---|---|
|  | Unreduced | Reduced* | Unreduced | Reduced* |
| Theoretical | 45.6 | 41.5 | 58 | 52.7 |
| Air dry-264 hrs. | 51.0 | — | 58 | — |
| Air dry-144 hrs. | — | 49.2 | — | 52.6 |
| Air dry-264 hrs. plus 60 min. at 180° F. | 50 | — | 52.6 | — |
| Air dry-264 hrs. plus 31 min. at 180° F. | — | 46.5 | — | 51.7 |

*Diluted with toluene to give the theoretical percentage of solids noted.

These results show that the blends of this invention can be used to produce paints which give less pollution by release of volatile solvents into the atmosphere. The color and protective properties of the coating composition are, however, not affected by the diethyl fumarate reactive diluent.

I claim:

1. A mixture of a drying oil coating resin and diethyl fumarate, the resin:diethyl fumarate weight ratio being in the range 50:1 to 50:50.
2. The mixture of claim 1 wherein the coating resin is an alkyd.
3. The mixture of claim 2 wherein the alkyd is a tall oil fatty acid alkyd.
4. The mixture of claim 2 wherein the alkyd is a linseed oil fatty acid alkyd.
5. The mixture of claim 1 carrying 5 to 75% by weight of pigment.
6. The process which comprises forming a mixture of claim 1, applying the mixture to a substrate, and drying the applied mixture in air.
7. The process of claim 6 wherein the coating resin is an alkyd.
8. The process of claim 6 wherein the mixture is pigmented.
9. The process of claim 8 wherein the substrate is a metal.
10. The process of claim 9 wherein the substrate is ferrous.
11. The process of claim 6 including the additional step of applying a different coating material over the air-dried mixture.
12. A manufacture comprising a substrate carrying an air-dried mixture of claim 1.
13. A manufacture of claim 12 wherein the substrate is a metal.
14. A manufacture of claim 11 wherein the metal substrate is ferrous.
15. A manufacture comprising a ferrous substrate, a layer of an air-dried mixture of claim 1 as a primer upon the substrate, and a protective coating upon the primer.
16. A manufacture of claim 13 wherein the protective coating is formed from a urethane.

* * * * *